Jan. 20, 1970    J. J. PARKER    3,490,778
COLLET CHUCK
Filed Sept. 12, 1967

INVENTOR
JOHN J. PARKER

BY
Barnes, Kisselle, Raisch & Choate
ATTORNEYS

United States Patent Office 3,490,778
Patented Jan. 20, 1970

3,490,778
COLLET CHUCK
John J. Parker, Detroit, Mich., assignor of one-half to
London T. Morawski, Warren, Mich.
Filed Sept. 12, 1967, Ser. No. 667,138
Int. Cl. B23b 31/40
U.S. Cl. 279—2                                4 Claims

ABSTRACT OF THE DISCLOSURE

A collet chuck for workpieces having a small diameter bore in which the collet engages, the body of the chuck having a conical nose on which the expandable collet is supported and the diameter of the conical nose at the portion connected with the body of the chuck being substantially greater than the outer diameter of the bore-gripping portion of the collet.

The present invention relates to collet chucks and more particularly to collet chucks adapted for supporting workpieces that are provided with a relatively small diameter bore by means of which the workpiece is adapted to be engaged by the collet.

Many workpieces which must be collet-supported during processing are provided with relatively small bores for engagement by the collet. One of the problems associated with collet chucks adapted for supporting workpieces with such small bores is that the collet-supporting portion of the chuck is of relatively small diameter and, thus, relatively flexible. When the central spindle of a collet chuck on which the collet member is mounted is flexible, inaccuracies in machining, grinding, etc. result.

It is an object of this invention to provide a collet chuck of very rigid construction adapted for supporting workpieces having relatively small diameter bores.

A more specific object of the present invention resides in the provision of a chuck having a central axially-extending boss on which the collet member is mounted, the boss being conically shaped and proportioned such that the diameter of the boss at the portion connected with the body of the chuck is substantially larger than the diameter of the portion of the collet adapted to engage within the portion of the workpiece to be supported.

Figure 2:
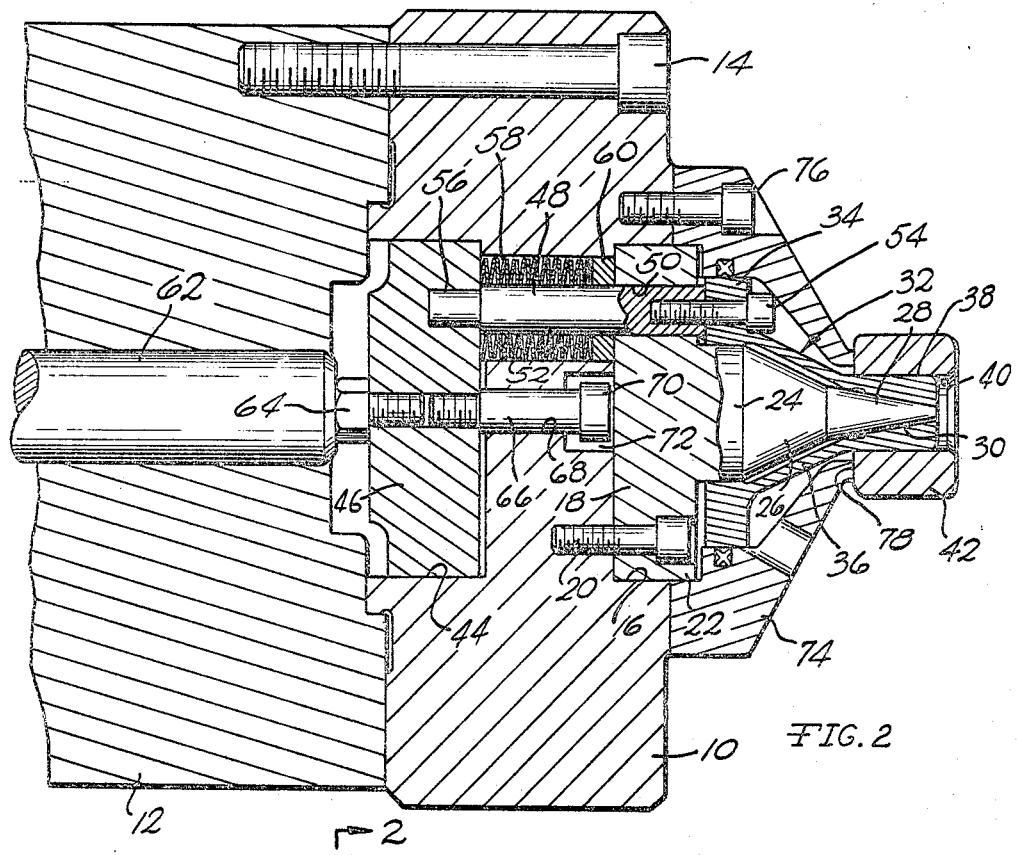
FIGURE 2 is a sectional view taken along the line 2—2 of FIG. 1.
Figure 1:
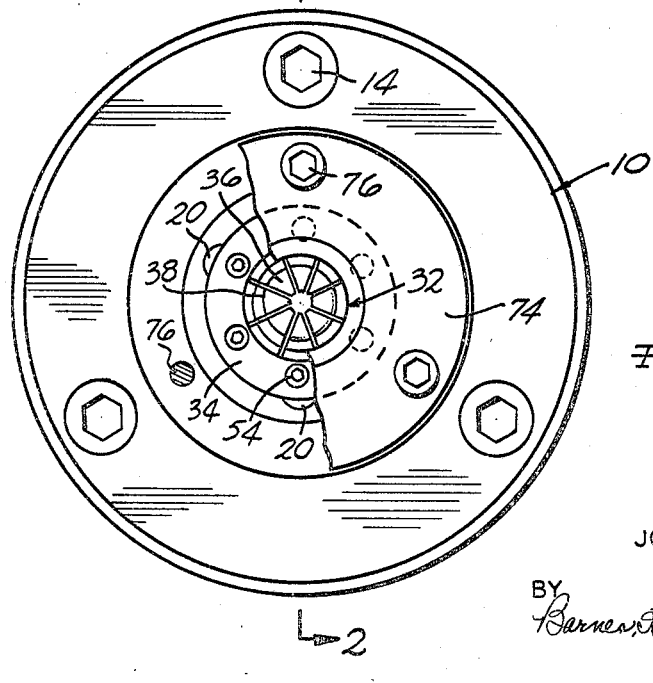
FIGURE 1 is an end view of the chuck of the present invention with portions broken away.

The chuck of the present invention includes a body 10 adapted to be rigidly mounted on the rotating spindle 12 of a machine tool by a plurality of screws 14. Body 10 has a centrally located cylindrical recess 16 on its front face in which a boss 18 is seated. Boss 18 is secured on body 10 by a plurality of screws 20. Boss 18 is formed with a circular cylindrical rear portion 22 received within recess 16 and through which screws 20 extend. Forwardly of cylindrical portion 22 boss 18 is formed with a second circular cylindrical portion 24 of smaller diameter than the portion 22. The free end of boss 18 is formed with two conically-shaped portions 26, 28. As is clearly evident from FIG. 2, the slope of the outer surface of the axially-innermost, conically-shaped portion 26 is greater than the slope of the outer surface of the axially-outermost conical portion 30 of portion 28.

A collet 32 is arranged on boss 18. Collet 32 has a solid mounting ring portion 34 which is piloted on the cylindrical portion 24 of boss 18. The portion of collet 32 extending forwardly of mounting ring 34 is in the form of a plurality of circumferentially-spaced, axially-extending spring fingers 36. In the embodiment illustrated fingers 36 are spaced radially outwardly from the taper portion 26 of boss 18. The free ends of fingers 36 are machined and ground around the inner periphery of the collet to have a close fit with the conical surface 30 of portion 28 of boss 18. Around their outer periphery the free ends of fingers 36 are shaped as a cylindrical surface 38 adapted to engage with the cylindrical bore 40 of a workpiece 42.

Body 10 is formed with a second centrally-located cylindrical recess 44 at its inner face. Within recess 44 there is slidably arranged a collet pull-back member 46. Collet 32 is connected to pull-back member 46 by a plurality of pins 48 which extend through openings 50 in the cylindrical portion 22 of boss 18 and through openings 52 in body 10 which interconnect recesses 16 and 44. Collet 32 is rigidly connected with the forward ends of pins 48 by screws 54 and the rear ends of pins 48 are rigidly connected to pull-back member 46 by means of brazing at the reduced end portions 56 of the pins. The openings 52 in body 10 are substantially larger in diameter than pins 48 and a plurality of springs 58, preferably of the Belleville type, are arranged in openings 52 around pins 48 so that they bear at one end against pull-back member 46 and at their other ends against spacers 60. Pins 48 have a sliding fit in the openings 50. Thus springs 58 normally urge pull-back member 46 rearwardly or to the left as shown in FIG. 2 so that the free ends of fingers 36 are normally expanded by the conical portion 28 of boss 18. The free end of the collet is adapted to be contracted by means of a pusher bar 62 within spindle 12 which bears against the head of a screw 64 threaded into pull-back member 46 from the rear side thereof. A second screw 66 projects forwardly from pull-back member 46 through a central bore 68 in body 10 with the enlarged head 70 of the screw disposed within a recess 72 in body 10.

A conventional work-locating ring 74 is rigidly secured to the front face of body 10 by screws 76. As is shown in FIG. 2, ring 74 is generally conically shaped and has an accurately-machined annular front face 78 against which one face of the workpiece 42 is adapted to abut to accurately locate the workpiece on the chuck.

In operation the collet 32 is collapsed at its forward end by actuating pusher bar 62 to the right as shown in FIG. 2 so as to abut screw 64 and thereby shift pull-back member 46 forwardly. In turn the pins 48 shift collet 32 forwardly on boss 18 and, since the fingers 36 are resilient and normally tend to contract, the cylindrical surface 38 defined by the forward end portions of fingers 36 is circumferentially ensmalled to a diameter slightly less than the bore 40 in the workpiece 42. The workpiece 42 is then slipped over the end of collet 32 to a position wherein it abuts the annular locating surface 78 of ring 74. Bar 62 is then retracted or released and springs 58 thus cause the collet 32 to shift to the left as viewed in FIG. 2 on boss 18 to thereby radially expand the free ends of collet fingers 36 into tight gripping relation with the bore 40 of workpiece 42.

In the above described collet chuck construction it will be observed that, while the bore 40 of workpiece 42 is of relatively small diameter, the boss 18 on which the collet is supported is of relatively heavy, rigid construction. This is a characteristic feature of the collet chuck of the present invention. The cylindrical portion 24 on which the mounting ring portion 34 of collet 32 is slidably piloted has a diameter substantially greater than the diameter of the cylindrical surface 38 at the free end of the collet. The length and the taper on the conical portions 26, 28 are determined such that the nose portion of boss 18 provides a relatively rigid and solid support for the collet. Thus, even though the bore 40 in the workpiece 42 is relatively small, the nose of boss 18 is of heavy

I claim:

1. A collet chuck having a body adapted for mounting on a machine spindle and provided with an axially-extending central boss at one end thereof, said boss being conically shaped at its free end, a collet member piloted for axial sliding movement on the conically-shaped portion of the boss and being circumferentially expandable in response to axial movement of the collet member in a direction away from the free end of the boss, a collet-actuating member mounted for axial sliding movement on said body and connected with the inner end of the collet member, the free end of the collet member having an outer peripheral work-gripping surface adapted to engage the bore of a workpiece to be supported by the chuck, the transverse dimension of said free end of the collet being substantially less than the transverse dimension of the conically-shaped portion of the boss at the base of the cone and substantially less than the transverse dimension of the portion of the boss connected with the body, the axial extent of said work-gripping surface of the collet member being substantially less than the axial extent of the conical portion of said boss, the portions of the boss connected with said body being of generally cylindrical shape and the inner end of the collet member being piloted on said cylindrically shaped portion of the boss.

2. A collet chuck as called for in claim 1 wherein the transverse dimension of said cylindrical portion of the boss is at least as great as the transverse dimension of the conical portion of the boss at the base of the cone.

3. A collet chuck as called for in claim 1 wherein the transverse dimension of said cylindrically-shaped portion of said boss is substantially equal to the transverse dimension of the conical portion of the boss at the base of the cone.

4. A collet chuck having a body adapted for mounting on a machine spindle, said body having a front face provided with a central recess, an axially extending central boss having a base portion at its inner end seated in said recess with a close fit, said base portion being circumferentially continuous around its outer periphery, a plurality of screws securing said base portion within said recess, said boss being conically shaped at its outer free end, a collet member piloted for axial sliding movement on the conically shaped portion of the boss and having its outer free end circumferentially expandable in response to axial movement of the collet member in a direction axially inwardly of the free end of the boss, said collet member having a circumferentially continuous ring portion adjacent its inner end, a collet actuating member mounted for axial sliding movement on said body, means connecting said collet actuating means with said circumferentially continuous ring portion, said last-mentioned connection means extending through said base portion of the boss radially inwardly of the circumferentially continuous outer periphery thereof, the free outer end of the collet member having an outer peripheral work-gripping surface adapted to engage the bore of a workpiece to be supported by the chuck, the transverse dimension of said free outer end portion of the collet member being substantially less than the transverse dimension of the base of the conically shaped portion of the boss and substantially less than the transverse dimension of the portion of the boss connected with said base portion thereof, the axial extent of said work-gripping surface of the collet being substantially less than the axial extent of the conical portion of the boss, the portion of said boss which connects the conically shaped portion thereof with the base portion being of generally cylindrical shape and circumferentially continuous, said ring portion of the collet member having a circumferentially continuous inner periphery which is piloted on said cylindrically shaped portion of the boss.

References Cited

UNITED STATES PATENTS 674,475  5/1901  Schuster _____ 82—44

FOREIGN PATENTS 759,856  10/1956  Great Britain.
367,685  4/1963  Switzerland.

LESTER M. SWINGLE, Primary Examiner

DONALD D. EVANSON, Assistant Examiner

U.S. Cl. X.R.

82—44